US005802306A

United States Patent [19]

Hunt

[11] Patent Number: 5,802,306
[45] Date of Patent: Sep. 1, 1998

[54] SUPPORTING MULTIPLE CLIENT-SERVER SESSIONS FROM A PROTOCOL STACK ASSOCIATED WITH A SINGLE PHYSICAL ADAPTER THROUGH USE OF A PLURALITY OF LOGICAL ADAPTERS

[75] Inventor: Gary T. Hunt, Austin, Tex.

[73] Assignee: International Business Machines Corporation, Armonk, N.Y.

[21] Appl. No.: 551,015

[22] Filed: Oct. 31, 1995

[51] Int. Cl.$^6$ .................................................... G06F 13/00
[52] U.S. Cl. .......................... 395/200.58; 395/200.33; 395/200.5; 395/200.51; 395/200.52; 395/200.56; 395/200.57; 395/200.6; 395/285; 370/245; 370/409; 370/469
[58] Field of Search .................. 395/200.01, 200.02, 395/200.1, 200.13, 200.14, 200.15, 200.17, 200.18, 200.2, 800, 200.31, 200.33, 200.5–200.52, 200.54, 200.56–200.6, 200.79–200.8, 285, 830–831; 370/245, 409, 466, 469

[56] References Cited

U.S. PATENT DOCUMENTS

| 4,768,149 | 8/1988 | Konopik et al. ..................... 395/867 |
| 4,771,286 | 9/1988 | Niessen et al. ..................... 340/825.52 |
| 4,823,338 | 4/1989 | Chan et al. ......................... 370/522 |
| 4,831,620 | 5/1989 | Conway et al. ..................... 370/401 |

(List continued on next page.)

OTHER PUBLICATIONS

Krupczak et al, "Multi–Subsystem Protocol Architectures : Motivation and Experience with an Adapter–Based Approach", Networking the Next Generation (Cat. No.96CB35887) vol. 3, pp. 1149–1156, Mar. 1996.

Dalton et al, "Afterburner:A Network–Independendent Card Provides Architectural Support for High–Performance Protocols", IEEE Network vol. 7, pp. 36–43, Jul. 1993.

Method of Badwidth Management by Dynamic Port Configuration, Dec. 1991, IBM Technical Disclosure Bulletin, 261–65.

David Greenfield, From a Distance: Dial–In Comm Servers Look Smarter Than Ever, Mar. 21, 1991, Data Communications, 57–63.

Barrett, Wunderlich, LAN Interconnect Using X.25 Network Services, Sep. 1991, IEEE Network Magazine, 12–16.

Per Somer, Connection Caching of Traffic Adaptive Dynamic Virtual Circuits, Sep. 1989, Computer Communications Review, 13–24.

3Com/Microsoft LAN Manager Network Driver Interface Specification, Version 2.0.1 Final, Chap. 7, Oct. 1990, NDIS Specification, pp. ii, 77–80.

Tutorial guide to Unix sockets for network communications, Networks, vol. 10, No. 1, Feb. 1987 (pp. 21–29).

*Primary Examiner*—Parshotam S. Lall
*Assistant Examiner*—Bharat Barot
*Attorney, Agent, or Firm*—Jeffrey S. LaBaw; David H. Judson

[57] ABSTRACT

A method implemented in a computer network supports a number of client-server sessions from a protocol stack having a single physical adapter associated therewith. The method begins by associating at least two logical adapters to the physical adapter, with each of the logical adapters being adapted to handle a predetermined subset of the number of sessions. Sessions are then allocated to the logical adapters in a sequential manner. In particular, the sessions are allocated to a first logical adapter until the predetermined subset of the number of sessions for that adapter is reached, whereupon the sessions are allocated to a second logical adapter. Each session is associated with a pair comprising an identifier for the logical adapter and an entry in an associated table, with the table entry being a socket number. Communications are "routed" through the physical adapter and the logical adapters by associating socket numbers with logical adapter/session number pairs.

16 Claims, 4 Drawing Sheets

U.S. PATENT DOCUMENTS

| | | | |
|---|---|---|---|
| 4,837,788 | 6/1989 | Bird | 375/211 |
| 4,887,075 | 12/1989 | Hirasawa | 395/200.67 |
| 4,930,159 | 5/1990 | Kravitz et al. | 380/23 |
| 4,967,348 | 10/1990 | Naito et al. | 707/200 |
| 5,031,174 | 7/1991 | Nutsome | 370/452 |
| 5,060,228 | 10/1991 | Tsutsui et al. | 370/402 |
| 5,079,764 | 1/1992 | Orita et al. | 370/403 |
| 5,086,426 | 2/1992 | Tsukakoshi et al. | 370/405 |
| 5,109,484 | 4/1992 | Hughes et al. | 395/200.52 |
| 5,144,622 | 9/1992 | Takiyasu et al. | 370/401 |
| 5,161,102 | 11/1992 | Griffin et al. | 395/284 |
| 5,206,936 | 4/1993 | Holland et al. | 395/309 |
| 5,224,098 | 6/1993 | Bird et al. | 395/500 |
| 5,235,639 | 8/1993 | Chevalier et al. | 380/4 |
| 5,237,690 | 8/1993 | Bealkowski et al. | 395/653 |
| 5,257,378 | 10/1993 | Sideserf et al. | 395/652 |
| 5,280,588 | 1/1994 | D'Ambrose et al. | 395/823 |
| 5,301,276 | 4/1994 | Kimura | 395/829 |
| 5,307,347 | 4/1994 | Duault et al. | 370/439 |
| 5,319,770 | 6/1994 | Lehman | 395/500 |
| 5,448,566 | 9/1995 | Richter et al. | 370/431 |
| 5,454,078 | 9/1995 | Heimsoth et al. | 395/200.52 |
| 5,491,800 | 2/1996 | Goldsmith et al. | 395/200.51 |
| 5,515,508 | 5/1996 | Pettus et al. | 395/200.33 |
| 5,548,723 | 8/1996 | Pettus | 395/200.58 |
| 5,619,650 | 4/1997 | Bach et al. | 395/200.76 |

SUPPORTING MULTIPLE CLIENT-SERVER SESSIONS FROM A PROTOCOL STACK ASSOCIATED WITH A SINGLE PHYSICAL ADAPTER THROUGH USE OF A PLURALITY OF LOGICAL ADAPTERS

TECHNICAL FIELD

The present invention relates generally to computer communications and, more particularly, to increasing the number of sessions that may be supported on a particular machine in a local area network (LAN).

BACKGROUND OF THE INVENTION

There has been a dramatic increase recently in the networking of personal computers and workstations. LAN's allow users to share files, to support electronic mail and to perform other functions previously identified as mainframe or minicomputer functions. Now, even the most modest enterprise can afford a computing system that just a few years ago would not have been economically feasible.

Local area network managers are becoming more varied, consisting of different LAN technologies, multiple vendors and multiple adapters. There is also a higher performance requirement and a greater need for an increased number of connections to servers and to network management. In the prior art, it has been known to support a number of protocol "stacks" on a particular machine to enable support of multiple network protocols. Thus, for example, a machine may support a NETBIOS (NETwork Basic Input/Output System) stack, a TCP/IP (Transmission Control Protocol/Internet Protocol) stack, and other stacks (such as SNA, OSI/CS, and the like). TCP/IP may include an application programming interface layer, called TCPBEUI (which was developed by and available from IBM), for converting NETBIOS programming interface calls to "sockets." At the data link level, NETBIOS and TCP/IP may use Token Ring or Ethernet, and both protocols may run on the same physical adapter, which is a physical card device, that actually connects to the network itself.

In the past, it has been known to associate a logical representation (a so-called "logical adapter," which is a data structure supported in memory) with each physical adapter. Thus, for example, the NETBIOS protocol stack is designed so that there is a one-to-one correspondence between the physical adapters and the defined logical adapters. If a workstation is running native NETBIOS and TCPBEUI-based protocol stacks on a single physical adapter, a NETBIOS programming interface application will "see" two logical NETBIOS-capable adapters (one for native NETBIOS and the other for TCPBEUI) even though there is only one physical adapter. As used herein, "native" NETBIOS refers to the fact that application requests made to a NETBIOS programming interface generate NETBIOS protocol on the LAN. Currently, native NETBIOS can emulate a logical adapter for each physical adapter in the machine, and each NETBIOS logical adapter is limited to 254 sessions per server (as a result of a one byte session number). THE OS/2 NETBIOS protocol stack can support more than 254 NETBIOS sessions per server by providing multiple (e.g., up to sixteen) physical adapters and emulating a logical adapter for each such physical adapter.

TCP/IP incorporates a naming scheme wherein an ip (Internet protocol) address is associated with a physical adapter. One protocol stack can support many physical adapters where each physical adapter has a different ip address. TCPBEUI is an implementation of the Open Systems Foundation (OSF) specification RFC 1001/1002, which details how to interface NETBIOS to TCP/IP. An important aspect of this specification is the association of NETBIOS names to ip addresses. In this specification, a NETBIOS name can only be associated with one ip address. Therefore, TCPBEUI can only be associated with and speak to one physical adapter, and it is currently implemented to emulate just one logical NETBIOS adapter. Since the 254 session limit is a per logical adapter limit, TCPBEUI is currently restricted to 254 sessions per server. This restriction has prevented applications from handling more than this number of sessions per server. LAN protocol components conforming to OSF specification RFC 1001/1002 thus cannot support any greater number of sessions, even though the TCP/IP protocol does not have this 254 session limit.

BRIEF SUMMARY OF THE INVENTION

It is thus a primary object of the present invention to increase the number of sessions that may be supported by a particular protocol stack in a local area network.

It is a further object of the invention to enhance session support by implementing multiple logical adapters on a single protocol stack that would otherwise normally support just one logical adapter.

It is still another object of the invention to emulate multiple logical NETBIOS adapters on a single physical adapter.

It is another more particular object to configure a number of logical adapters to support an anticipated number of client-server sessions from a protocol stack, and then routing information for the multiple logical adapters through a single physical adapter associated with that stack.

Another object of the invention to support any number of client-server sessions from a protocol stack associated with a single physical adapter by configuring a plurality of logical adapters to handle the sessions and then allocating the sessions to the logical adapters in a sequential manner. Each session has associated therewith a pair comprising an identifier associated with one of logical adapters, and a session identifier. The pairs are maintained in a data structure associated with each logical adapter.

A particular object of the invention is to support more than 254 sessions per server in an OSF RFC 1001/1002 TCP/IP implementation.

Another specific object of the invention is to enable TCPBEUI For a similar TCP interface application) to emulate multiple logical NETBIOS (or like) adapters, with communications to the logical adapters "routed" though a single physical adapter.

In the preferred embodiment, a method implemented in a computer network supports a number of client-server sessions from a protocol stack having a single physical adapter associated therewith. The method begins by associating at least two logical adapters to the physical adapter, with each of the logical adapters being adapted to handle a predetermined subset of the number of sessions. Sessions are then allocated to the logical adapters in a sequential manner. In particular, the sessions are allocated to a first logical adapter until the predetermined subset of the number of sessions for that adapter is reached, whereupon the sessions are allocated to a second logical adapter. Each session is associated with a pair comprising an identifier for the logical adapter and an entry in an associated table, with the table entry being a socket number. Communications are "routed" through the physical adapter and the logical adapters by associating socket numbers with logical adapter/session number pairs.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
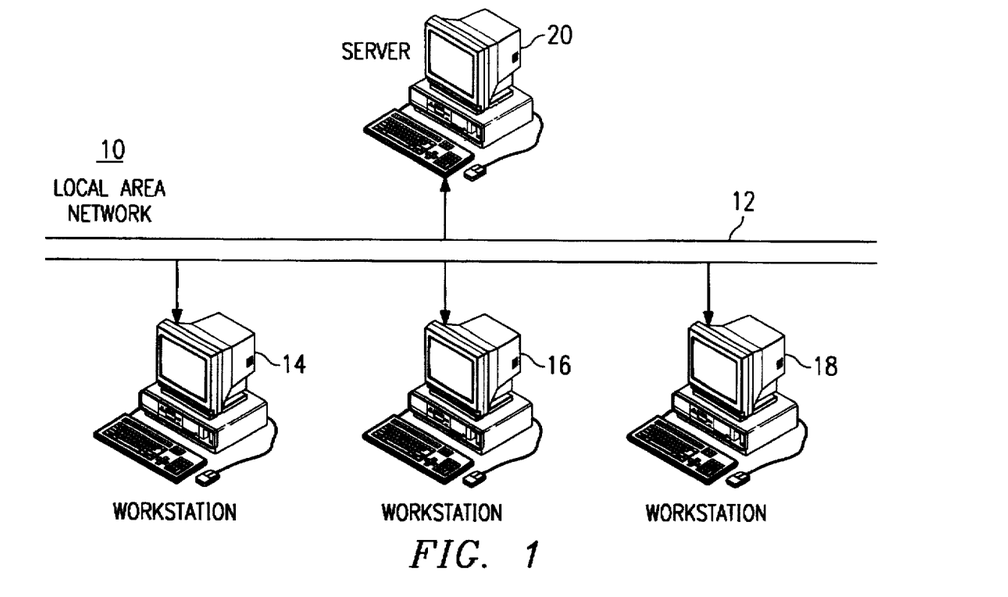
FIG. 1 illustrates a computer network in which the present invention is implemented.

Referring now to the drawings, and more particularly FIG. 1, there is shown a typical local area network (LAN) 10 comprising a common cabling system 12 to which a plurality of workstations 14, 16 and 18 are connected to a server 20. A local area network provides a distributed computing environment in which users can access distributed resources and process applications on multiple computers. Network communications are carried out using so-called communication protocols. It is understood by those of ordinary skill in the art that the workstations are equipped with a physical adapter card and that the cabling system may have a bus or ring topology and be implemented as a coaxial cable, twisted pair, fiber optic cable or any other supported communications media. Moreover, the several workstations need not be physically identical and may have differing features.

Figure 2:
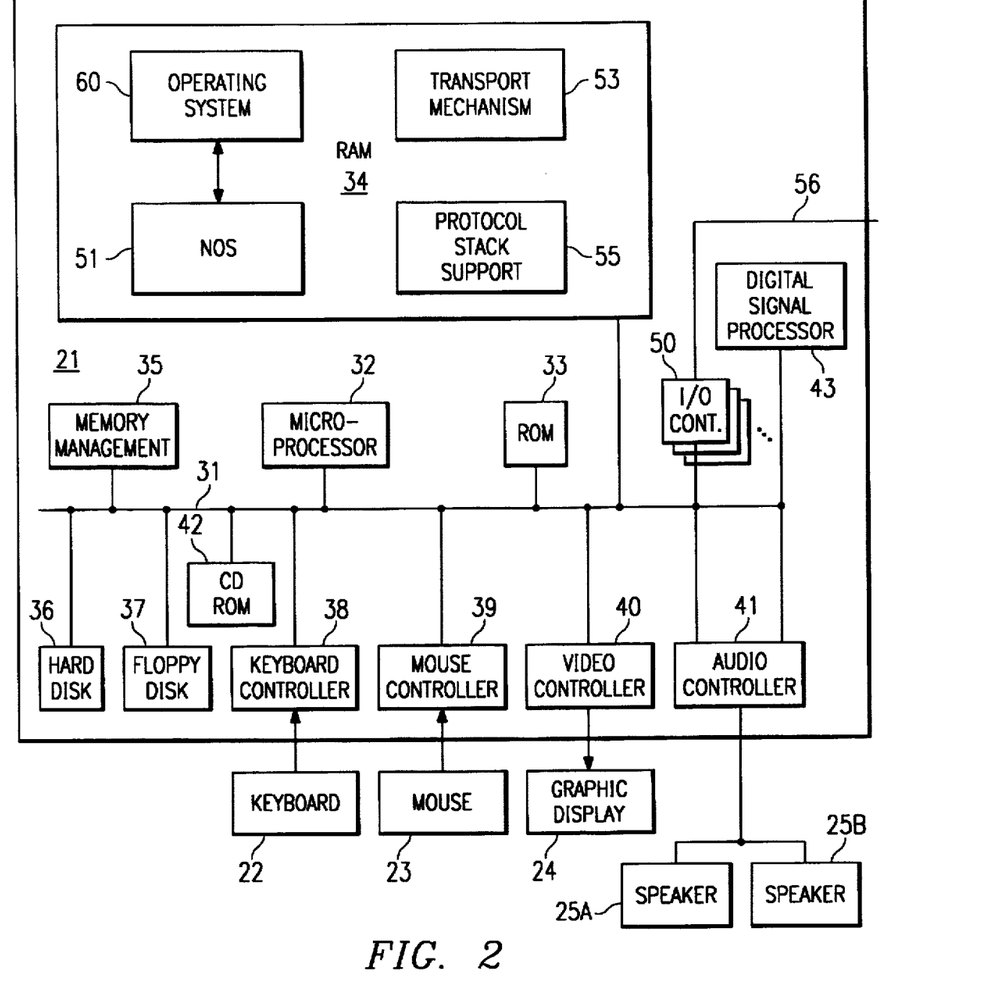
FIG. 2 illustrates a representative personal computer or "workstation" of FIG. 1 which forms part of the LAN.

Each of the workstations is a computer. For example, each computer may be an IBM® PS/2®running under the OS/2®operating system. For more information on the PS/2®line of computers and the OS/2®operating system, the reader is directed to *Technical Reference Manual Personal Systems/2 Model 50, 60 Systems IBM Corporation*, Part No. 68X2224 Order Number S68X-2224 and *OS/®2.0 Technical Library. Programming Guide Volumes 1–3 Version 2.00*, Order Nos. 10G6261, 10G6495 and 10G6494.While the invention will be described in terms of this hardware and software, one skilled in the art will recognize that other operating systems and hardware can be supported without undue experimentation. Also resident on the computer system is network operating system software for controlling LAN communications. Such software is described in the following publications available from IBM and incorporated herein in their entirety by reference: *IBM Operating System/2 Local Area Network Server Version 4.0 Information and Planning Guide* (G236-0162), *Local Area Network Server Programs (Specification Sheet)*(G360-2753), and *IBM Local Area Network Technical Reference* (SC30-3383). Each of the workstations may function as a client or a server. A particular client and server communicate over the network during a state referred to as a session. FIG. 2 shows a block diagram of the components of one of the computers shown in FIG. 1. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in the IBM Multimedia PS/2 series of computers is one of the Intel family of microprocessors including the 386 or 486 microprocessors. However, as noted above, other microprocessors including, but not limited to, Motorola's family of microprocessors such as the 68000, 68020 or the 68030 microprocessors and various RISC microprocessors manufactured by IBM, Hewlett Packard, Sun, Intel, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system (OS) 60 and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. A digital signal processor 43 may also be used. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers 25a and 25b. One or more I/O controllers 50, such as a Token Ring Adapter, and Ethernet Adapter, a PC-Net Adapter, and so on, enables communications over the network 56 to other similarly configured data processing systems.

RAM 34 also supports a Network Operating System (NOS) 51 and an associated transport mechanism 53 which together control LAN communications. A protocol stack support routine 55 is also supported for enhancing the number of server sessions that may be supported by the machine, as will be described in more detail below.

Figure 3:
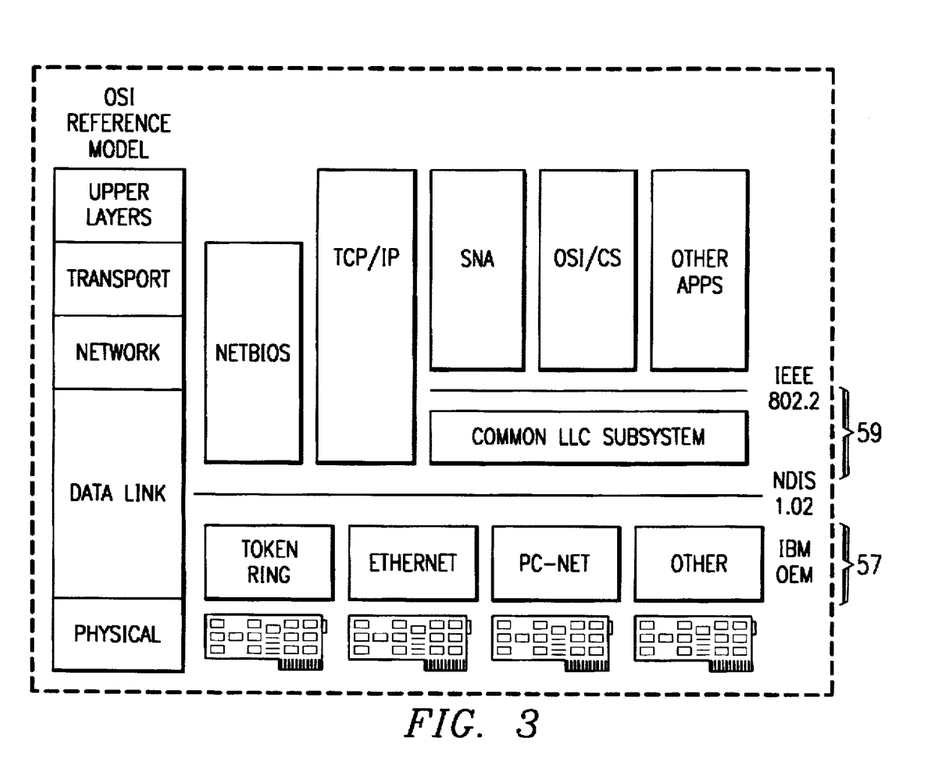
FIG. 3 is a block diagram of a representative LAN Network Operating System (NOS) and transport architecture for the computer of FIG. 2.

FIG. 3 represents a block diagram of the Network Operating System (NOS) and LAN transport mechanism running in the workstations of FIG. 2. Conceptually, all of the components (except the physical cards) are supported in software running in the RAM 34 of the computer. As seen in the left portion of the figure, by convention communication architectures in a local area network are typically characterized as conforming to a seven layer model in the following hierarchy: physical layer, logical or "data" link layer, network layer, transport layer, and the upper layers comprising session layer, presentation layer and application layer. The physical layer comprises the actual physical devices and medium used to transmit information, and it consists of physical adapter cards. The logical or data link layer frames data packets and controls physical layer data flow, insuring delivery of data regardless of the actual physical medium. The network layer addresses and routes data packets. It creates and maintains a route in the network between a source node and a destination node of the network. The transport layer creates a transport pipeline between nodes and manages the network layer connections. The session layer typically provides remote procedure call (RPC) support, maintains the integrity of the connection between nodes and controls data exchange. The presentation layer encodes and decodes data and provides transparency between nodes. Finally, the application layer provides the interface to end-user processes and provides standardized services to applications.

The seven layer model has many variations depending on the particular network architecture. Thus, for example, in a network architecture based on the TCP/IP (Transmission Control Protocol/Internet Protocol) or other interface, there is another layer, called the socket layer, that sits between the session and transport layers. The socket layer creates so-called "sockets" which are logical constructs analogous to physical ports and which may define endpoints to applications. The transport mechanism includes a Network Driver Interface Specification (NDIS) which provides a standardized medium access control interface for network adapter drivers 57 (identified as Token Ring, Ethernet, PC-Net, etc.) and protocol drivers 59 located within the protocol stacks (NETBIOS, TCP/IP, etc.). NDIS is described in detail in the *LAN Manager Network Driver Interface Specification*, published jointly by 3COM and Microsoft. NDIS has become an industry standard for network adapters and LAN software to communicate with each other. The NDIS layer separates protocol handling from hardware manipulation by defining functions that protocol drivers and network adapter drivers must provide to each other. NDIS defines specifications for network protocol drivers, adapter drivers, an interface between network protocol drivers and adapter drivers and a binding process to link the protocol and adapter drivers. The figure also shows that the mechanism supports the IEEE 802.2 specification, which is described in more detail in International Standard (ISO) 8802-2 (1989).

Figure 4:
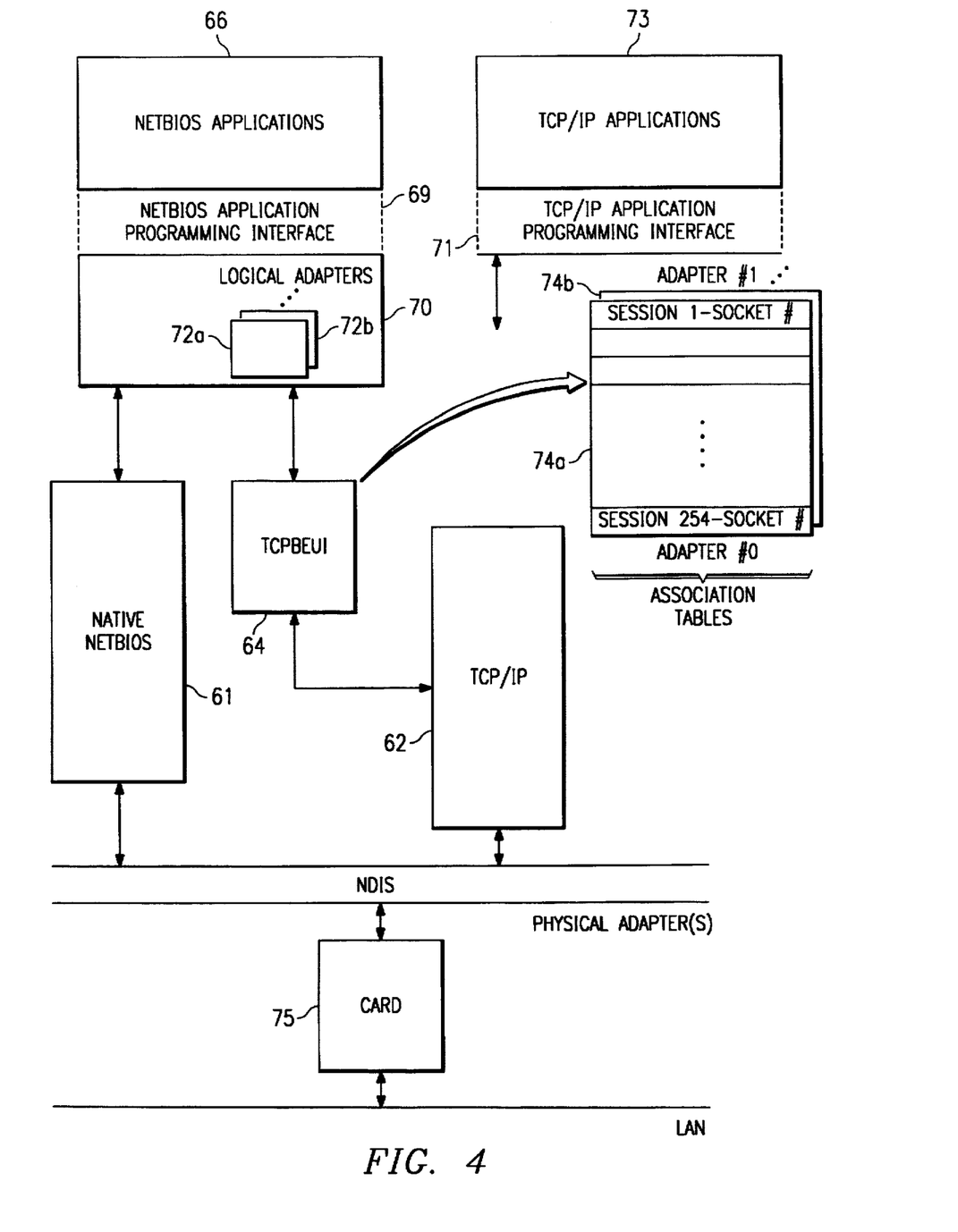
FIG. 4 is a block diagram of the LAN transport architecture of the present invention wherein a plurality of logical adapters are associated with a TCP/IP protocol stack and an associated TCPBEUI layer.

Referring now to FIG. 4, a simplified block diagram of the transport mechanism implemented according to the principles of the present invention is illustrated. The mechanism includes a native NETBIOS protocol stack 61, a TCP/IP protocol stack 62, and TCPBEUI layer 64. A number of NETBIOS applications 66 interface to the native NETBIOS protocol stack 61 and TCPBEUI 64 through a NETBIOS application programming interface 69 and a logical adapter interface 70. Logical adapter interface comprises a plurality of logical adapters 72a . . . 72n associated with the TCPBEUI layer 64. According to the invention, the plurality of logical adapters 72a . . . 72nare associated with a single physical adapter card. A TCP/IP application programming interface 71 interfaces TCP/IP applications 73 (which may include TCPBEUI, among others) to the TCP/IP protocol stack 62.

NETBIOS, by convention, requires that NETBIOS applications designate a logical adapter and session number in order to send and receive data to and from the network. TCP/IP applications, however, typically interface to the network and use "sockets" and not logical adapters and session numbers. Thus, as will be described below, the present invention provides a mechanism for converting logical adapter/session number pairs into socket numbers and vice versa. This enables the TCP/IP protocol stack to support a large number of client-server sessions and to enable network communications to be effectively "routed" from a single physical adapter card 75 through the multiple NETBIOS-based logical adapters 72.

The TCPBEUI layer maintains a correspondence between active TCP/IP sessions and the logical session numbers presented to the NETBIOS applications 66. Sessions at the NETBIOS programming interface are identified by a one byte session number and an adapter identifier (ID), which is typically a number from 0 to 15. According to the invention, the TCPBEUI layer 64 associates a "pair," comprising the session number and the appropriate logical adapter identified by the adapter ID, with a socket. The NETBIOS sessions are preferably allocated to logical adapters in a sequential manner, although this is not required. Thus, for example, the first 254 sessions are allocated to the first adapter 72a (with ID=0), as illustrated in the table 74a in FIG. 4. Once its limit is reached, the next session is allocated to the second adapter 72b (with ID =1) as shown in table 74b, and so on until the expected number of sessions are supported from the single protocol stack (and single physical adapter).

Figure 5:
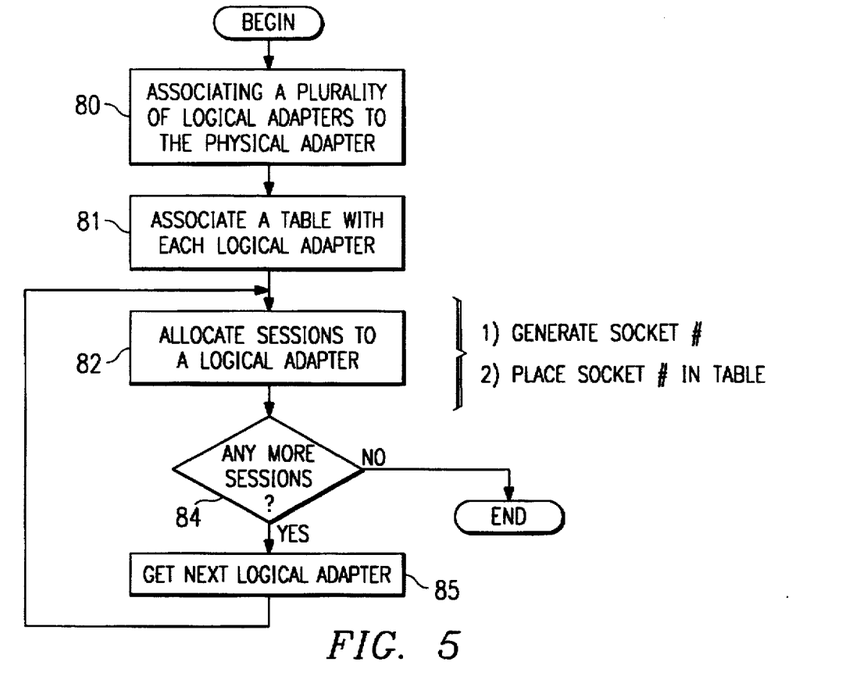
FIG. 5 is a flowchart of a preferred allocation routine according to the invention.

A flowchart illustrating this allocation process is shown in FIG. 5. Initially, the user configures the computer for enhanced session support by associating a plurality of logical adapters to a physical adapter. This is step 80 in FIG. 5, with the number of logical adapters being user-configurable and determined by the expected number of sessions and the predetermined subset of the number of sessions that are supportable on a given logical adapter. At step 81, TCPBEUI associates a table (or other similar object) with each logical adapter. Initially, each of the tables is empty. As the first session is created at the NETBIOS application programming interface, by default the socket number associated with this session (which is generated by the TCP/IP application programming interface 71) is placed into the first entry of the first table (namely table 0). As the second session is created, its associated socket number is placed into the next entry of the first table, and so on until all 254 entries are filled (in the TCPBEUI embodiment). When then next session is created, the maximum number of sessions has been reached, and therefore the socket number associated therewith is placed in a first entry of the second table (namely, the table associated with the second logical adapter). This process is represented in the flowchart beginning at step 82. At step 82, the routine allocates sessions to a logical adapter until the predetermined subset of the number of sessions for that adapter is reached. As noted above, "allocating sessions to a logical adapter" involves a two-step process: (1) having the TCP/IP application programming interface 71 generate a socket number for the session and then (2) placing that socket number in a table (or equivalent construct) associated with that logical adapter. Referring back to FIG. 5, a test is then performed at step 84 to determine whether there are any more sessions that need to be allocated. If the outcome of the test at step 82 is positive, the routine gets the next logical adapter in the plurality at step 85 and then returns to step 82 to allocate sessions to the next logical adapter of the plurality of logical adapters. This routine cycles until all sessions have been handled, as indicated by a negative outcome of step 84.

Figure 6:
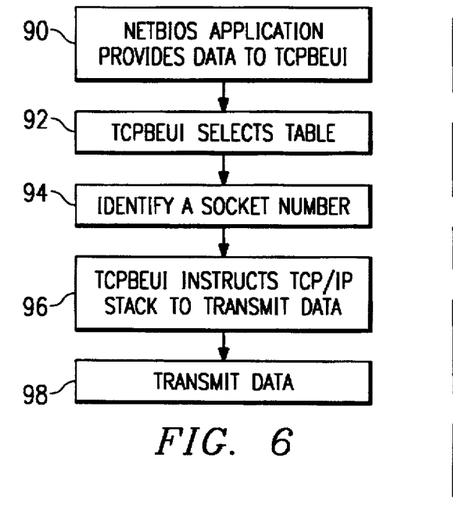
FIG. 6 is a flowchart illustrating how data is transmitted from a NETBIOS application through the transport mechanism.

FIG. 6 is a flowchart describing the process that takes place when a NETBIOS application desires to transmit data over the network. At step 90, the NETBIOS application provides the data to be transmitted and the adapter number/session number pair to TCPBEUI via the NETBIOS application programming interface 69. The NETBIOS application "talks" to the NETBIOS application programming interface by identifying a logical adapter and a session number for that (as NETBIOS does not deal with sockets). Using the adapter information, at step 92 TCPBEUI selects the appropriate table (of the plurality of tables) and then, at step 94, TCPBEUI uses the session number as an offset into that table to identify a socket number. At step 96, TCPBEUI then instructs TCP/IP to transmit the data on the resulting socket number found in the table, and the data is transmitted at step 98.

Figure 7:
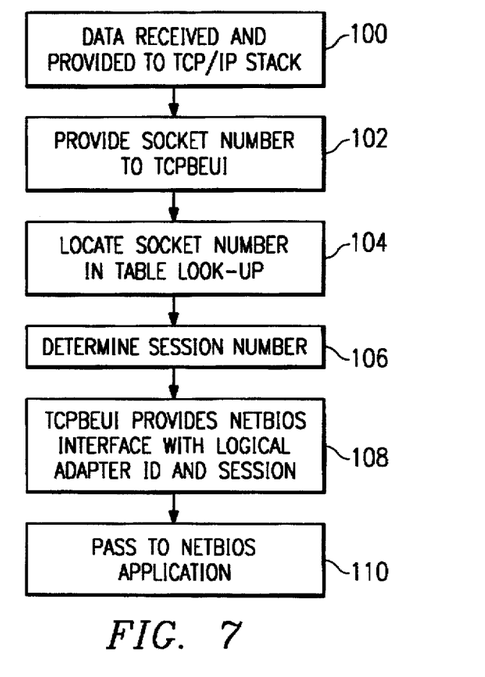
FIG. 7 is a flowchart illustrating how data is received from the network and provided to the NETBIOS application through the transport mechanism.

FIG. 7 illustrates how data on the wire (i.e. the network) is received and processed. At step 100, adapter card 74 receives the data packets and provides them to the TCP/IP protocol stack 62. The data packets are associated with a particular socket number. At step 102, TCP/IP 62 provides the socket number and data to TCPBEUI 64. At step 104, TCPBEUI locates the socket number in one of the tables. At step 106, TCPBEUI determines the session number by evaluating the "offset" (namely, the entry number in the particular table). At step 108, TCPBEUI provides the NETBIOS application programming interface 69 with a "pair" comprising (1) the logical adapter number (determined by the particular table in which the socket number is found) and (2) the session number (determined by the particular offset into that table). Interface 69 then provides this information to the particular NETBIOS application (associated with the session) at step 110.

The processes described in FIGS. 6 and 7 are transparent to the NETBIOS applications and enable these applications to run on TCPBEUI, as enhanced according to the invention, without change.

According to the invention, architectural rules of the NETBIOS programming interfaces are preserved. For example, in NETBIOS an incoming broadcast datagram is received only once (because there is only one physical adapter), and according to the invention this datagram is replicated by TCPBEUI and presented to all logical adapters 72. This process is unique to the multiple logical adapters on a single physical adapter implementation according to the present invention. Since there is a physical adapter per logical adapter with native NETBIOS and the datagram is received by each physical adapter, there is no need to replicate the datagram in the NETBIOS protocol stack.

Thus, implementation of multiple logical adapters on a single physical adapter according to the present invention allows TCPBEUI to support more than 254 sessions per server whereas native NETBIOS would be limited to 254 sessions on the same server. This architecture has the important advantage of allowing OSF RFC 1001/1002 support in network management software (such as LAN Server 4.0) that has heretofore been limited to 254 sessions/server. Thus, any network manager desiring compatibility with the NETBIOS-to-TCP/IP interface of the OSF RFC 1001/1002 specification may implement the teachings of the present invention to achieve the desired enhanced session support. Moreover, the implementation of a single protocol stack underneath multiple logical adapters is also considered useful for other protocol stacks besides TCP/IP and TCPBEUI, and thus the invention should not be construed to be limited to the preferred embodiment. Thus, for example, the teachings of the invention are also deemed useful for other similar protocol stacks normally having a single logical adapter limitation (such as Novell Netware IPX and the like).

The logical adapter/socket identifier pairs may be suitably supported in a dedicated portion of RAM 34 controlled by the TCPBEUI layer. The information need not be stored in table format, but may alternatively be structured as a linked list or other suitable object. As noted above, although preferably the logical adapters are accessed sequentially, this is not required as other suitable ordering may be used. In such case, it may be desirable to include other information with the logical adapter/socket identifier pair.

The code necessary to support this extended session support is preferably supported in the TCPBEUI layer. One of the preferred implementations of the invention is as a set of instructions in a code module resident in the RAM 34 of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive).

Although the invention has been described in terms of a preferred in a specific operating system and network environment, those skilled in the art will recognize that the invention can be practiced, with modification, in other and different operating systems and network architectures within the spirit and scope of the appended claims. The invention is not to be construed as limited to The OS/2 architecture and thus in a more general sense the invention should be broadly construed to cover any network environment where it is desired to increase the number of sessions supported by the LAN manager application and operate in conformance with the OSF RFC 1001/1002 interface specification.

In the preferred embodiment, the user of the computer determines the number of logical adapters to configure based on an expected number of sessions to be supported. One of ordinary skill, However, will appreciate that the logical adapters may be created dynamically as more and more sessions are requested. Thus, a user may configure the computer for just a single logical adapter and thereafter one or more additional logical adapters may be configured automatically by the network software as needed for support.

Having thus described my invention, what I claim as new and desire to secure by Letters Patent is set forth in the following claims:

1. In a computer network, a method of supporting a number of sessions from a protocol stack having a physical adapter associated therewith, comprising the steps of:
 (a) associating at least two logical adapters to the physical adapter with each of the logical adapters being adapted to handle a subset of the number of sessions;
 (b) allocating sessions to the at least two logical adapters in a sequential manner, wherein the sessions are allocated to a first one of the logical adapters until the subset of the number of sessions for that adapter is reached, whereupon the sessions are allocated to a second one of the logical adapters; and
 (c) controlling routing to the at least two logical adapters through the physical adapter.

2. In the computer network as described in claim 1 wherein the step of allocating sessions includes, for each session, the steps of:
 generating a socket number for the session;
 placing that socket number in a table associated with one of the at least two logical adapters.

3. In the computer network as described in claim 2 wherein the step of controlling routing includes associating socket numbers with logical adapter/session number pairs.

4. In the computer network as described in claim 1 wherein the protocol stack is TCP/IP supporting a TCPBEUI layer.

5. In the computer network as described in claim 4 wherein the subset of the number of sessions is 254.

6. In a computer network, a method of supporting an expected number of client-server sessions from a TCP/IP protocol stack having a single physical adapter associated therewith, comprising the steps of:

(a) associating a plurality of logical adapters to the physical adapter with each of the logical adapters being adapted to handle a predetermined subset of the number of sessions;

(b) allocating sessions to a logical adapter until the predetermined subset of the number of sessions for that adapter is reached;

(c) determining whether there are any more sessions;

(d) if there are any more sessions, repeating step (b) for a next logical adapter of the plurality of logical adapters until all sessions have been allocated; and (e) routing network communications to the logical adapters through the physical adapter.

7. In the computer network as described in claim 6 wherein the step of allocating sessions includes, for each session, the steps of:

generating a socket number for the session;

placing that socket number in a table associated with one of the logical adapters.

8. In the computer network as described in claim 7 wherein the step of routing includes associating socket numbers with logical adapter/session number pairs.

9. In the computer network as described in claim 6 wherein the protocol stack is TCP/IP supporting a TCPBEUI layer.

10. In the computer network as described in claim 9 wherein the predetermined subset of the number of sessions is 254.

11. In a local area network including a computer running a protocol stack supporting TCPIP and having an API converter layer, the protocol stack associated with a single physical adapter, the improvement comprising:

means for configuring at least two logical adapters to the single physical adapter; and means for allocating client-server sessions to the at least two logical adapters in a predetermined manner, wherein the allocating means allocates a first subset of the sessions to the first logical adapter and a second subset of the sessions to the second logical adapter.

12. A computer connected to a local area network, comprising:

a processor;

an operating system;

a local area network (LAN) management system run by the operating system for controlling network communications, the LAN management system including at least one protocol stack;

at least one physical adapter card connected between the local area network and the at least one protocol stack;

means for configuring at least two logical adapters to the at least one physical adapter card; and means for allocating client-server sessions to the at least two logical adapters in a predetermined manner, wherein the allocating means allocates a first subset of the sessions to the first logical adapter and a second subset of the sessions to the second logical adapter.

13. The computer as described in claim 12 wherein the second logical adapter is configured by the configuring means after the predetermined number of sessions are allocated to the first logical adapter.

14. The computer as described in claim 12 wherein the protocol stack is TCPBEUI.

15. The computer as described in claim 14 wherein the predetermined number of sessions allocated to the first logical adapter is 254.

16. A computer program product in a computer-readable medium for use in a computer having an operating system, a LAN manager and at least one physical adapter card connected to a local area network, the computer program product comprising:

means for configuring at least two logical adapters to the at least one physical adapter card; and means for allocating client-server sessions to the at least two logical adapters sequentially, wherein the sessions are allocated to a first one of the logical adapters until a subset of the number of sessions for that adapter is reached, whereupon the sessions are allocated to a second one of the logical adapters.

* * * * *

UNITED STATES PATENT AND TRADEMARK OFFICE
CERTIFICATE OF CORRECTION

PATENT NO : 5,802,306
DATED : September 1, 1998
INVENTOR(S) : Gary T. Hunt

It is certified that error appears in the above-identified patent and that said Letters Patent is hereby corrected as shown below:

Column 2, line 47, change "For" to --(or--.

Column 9, line 40, change "TCPIIP" to --TCP/IP--.

Signed and Sealed this

Thirteenth Day of February, 2001

Attest:

NICHOLAS P. GODICI

Attesting Officer  Acting Director of the United States Patent and Trademark Office